(12) United States Patent
Hu et al.

(10) Patent No.: US 12,247,668 B2
(45) Date of Patent: Mar. 11, 2025

(54) SWITCHING VALVE

(71) Applicant: XIAMEN DELMEI SANITARY WARE CO., LTD., Xiamen (CN)

(72) Inventors: Yunan Hu, Ganzhou (CN); Chunhua Wang, Xiamen (CN); Changzheng Ni, Xiamen (CN); Yongqiang Yan, Fuzhou (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 19 days.

(21) Appl. No.: 18/356,240

(22) Filed: Jul. 21, 2023

(65) Prior Publication Data

US 2024/0418274 A1  Dec. 19, 2024

(30) Foreign Application Priority Data

Jun. 13, 2023  (CN) .......................... 202321503746.5

(51) Int. Cl.
| | | |
|---|---|---|
| *F16K 11/04* | (2006.01) | |
| *F16K 11/044* | (2006.01) | |
| *F16K 31/44* | (2006.01) | |

(52) U.S. Cl.
CPC .......... *F16K 11/0445* (2013.01); *F16K 31/44* (2013.01); *F16K 2200/30* (2021.08)

(58) Field of Classification Search
CPC ........ F16K 11/07; F16K 11/0445; F16K 3/32; F16K 3/246; F16K 2200/30; F16K 1/52; E03C 2201/30
See application file for complete search history.

(56) References Cited

U.S. PATENT DOCUMENTS

| | | | | |
|---|---|---|---|---|
| 3,236,253 A | * | 2/1966 | Symmons | F16K 11/0445 |
| | | | | 137/119.05 |
| 5,069,241 A | * | 12/1991 | Hochstrasser | F16K 11/0445 |
| | | | | 137/119.05 |
| 5,845,670 A | * | 12/1998 | Life | E03C 1/023 |
| | | | | 137/119.05 |
| 6,182,700 B1 | * | 2/2001 | Hannemann | F16K 11/0445 |
| | | | | 137/881 |
| 2013/0291975 A1 | * | 11/2013 | Fangmeier | F16K 11/0445 |
| | | | | 137/636.1 |
| 2017/0173602 A1 | * | 6/2017 | Erickson | B05B 1/3026 |
| 2019/0168238 A1 | * | 6/2019 | Swanson | E03C 1/0404 |
| 2023/0184341 A1 | * | 6/2023 | Bian | F16K 27/0263 |
| | | | | 137/625.48 |

* cited by examiner

*Primary Examiner* — Kelsey E Cary

(57) ABSTRACT

The present disclosure provides a switching valve which includes a valve body provided with a water inlet channel, a first water outlet, and a second water outlet, wherein the valve body is internally provided with a first water outlet chamber and a second water outlet chamber; a driving component having a plug end, wherein the driving component is slidably connected between the first water outlet chamber and the second water outlet chamber; a reset component configured to control the driving component to return to a position where the plug end contacts the end portion of the side wall of the second water outlet chamber, such that the valve body is automatically switched from the second water outlet state to the first water outlet state. After the use of the second water outlet state, the driving rod is controlled to automatically return to the first water outlet state.

7 Claims, 4 Drawing Sheets

SWITCHING VALVE

CROSS-REFERENCE TO RELATED APPLICATIONS

This application is based upon and claims priority to Chinese Patent Application No. 202321503746.5, filed on Jun. 13, 2023, the entire contents of which are incorporated herein by reference.

TECHNICAL FIELD

The present disclosure relates to the technical field of water passage control, in particular to a switching valve.

BACKGROUND

The switching valve is a component for controlling water flow, it can direct the outflow water to spray out from the handheld shower or the top shower of the shower system.

Existing switching valves mainly use press-type switching or rotation-type switching. These types of switching valves have the following problems when they are in use. If the user switched the mode to top shower last time and forgot to switch back to the handheld shower mode, when the user suddenly turns on the shower this time, the water sprayed from the top shower can easily wet the user's clothes. Thus, in order to avoid the above situation, the user needs to manually press or rotate the knob to switch the water outflow mode back to the initial mode after use, and the operation is quite complicated.

Therefore, the present disclosure provides a switching valve which can address one or more of the above problems.

SUMMARY

The present disclosure provides a switching valve which can effectively solve the above problems.

The present disclosure provides a switching valve comprising:
  a valve body, wherein the valve body is provided with a water inlet channel, a first water outlet, and a second water outlet, the valve body is internally provided with a first water outlet chamber and a second water outlet chamber, openings of the first water outlet chamber and the second water outlet chamber are arranged opposite to each other, and the first water outlet chamber and the second water outlet chamber each has a hollow cavity surrounded and formed by a bottom wall and a side wall;
  a driving component, wherein the driving component has a plug end, and the driving component is slidably connected between the first water outlet chamber and the second water outlet chamber;
  when the driving component slides to a position where the plug end contacts an end portion of the side wall of the second water outlet chamber, the first water outlet chamber communicates with the water inlet channel and the first water outlet, and the valve body is in a first water outlet state with the second water outlet chamber closed;
  when the driving component slides to a position where the plug end contacts an end portion of the side wall of the first water outlet chamber, the second water outlet chamber communicates with the water inlet channel and the second water outlet, and the valve body is in a second water outlet state with the first water outlet chamber closed; and
  a reset component, wherein the reset component is configured to control the driving component to return to the position where the plug end contacts the end portion of the side wall of the second water outlet chamber, such that the valve body is automatically switched from the second water outlet state to the first water outlet state.

As a further improvement, the plug end is elastic and deformable, and when the valve body is in the first water outlet state or the second water outlet state, the plug end can tightly contact the end portion of the side wall of the first water outlet chamber or the second water outlet chamber.

As a further improvement, the end portion of the side wall of the first water outlet chamber and the end portion of the side wall of the second water outlet chamber each has a bell-mouth structure, and the bell-mouth structure extends outwards in an inclined manner in a direction away from the bottom wall of the first water outlet chamber or the second water outlet chamber.

As a further improvement, the driving component has an assembling groove, and the reset component is a resettable spring located in the assembling groove, an end of the resettable spring is coupled to the bottom wall of the first water outlet chamber, and an opposite end of the resettable spring is coupled to a bottom part of the assembling groove.

As a further improvement, the bottom wall of the first water outlet chamber is provided with a fixation pole, the resettable spring sleeves around a circumference of the fixation pole, and a deformation direction of the resettable spring is parallel to a length direction of the fixation pole.

As a further improvement, the switching valve further includes a rotation component rotatably arranged in the valve body, an end of the rotation component proximal to the water inlet channel is provided with a first adjustment sheet, the first adjustment sheet is provided with a first adjustment hole, and the valve body is internally provided with a second adjustment sheet attached with the first adjustment sheet, the second adjustment sheet is provided with a second adjustment hole, an overlapping area between the first adjustment hole and the second adjustment hole can be adjusted by rotating the rotation component.

As a further improvement, the driving component is slidably connected in the rotation component, and the first water outlet chamber and the second water outlet chamber are located in the rotation component.

As a further improvement, the valve body is internally provided with a filter screen and the filter screen is provided closely adjacent to the water inlet channel.

The present disclosure has the following advantages.

First, by configuring the reset component, after the use of the second water outlet state, the driving rod is controlled to automatically return to the first water outlet state in which the plug end contacts the end portion of the side wall of the second water outlet chamber. Thus, there is no need for the user to operate the driving rod to switch the mode back to the first water outlet state, and it can be ensured that the switching valve is in the water passage which is determined by the original setting (i.e. the first water outlet state) every time the user uses the shower system, thereby improving the convenience of using the switching valve.

Second, besides the reset function, the switching valve provided by the present disclosure can also adjust the flow rate of the water passage. By rotating the rotation component, the overlapping area between the first adjustment hole and the second adjustment hole can be adjusted to realize the adjustment of the flow rate.

Third, by configuring the filter screen, the water flow entering the water inlet channel can be divided, thereby reducing the noise caused by the water passage in the switching valve.

BRIEF DESCRIPTION OF THE DRAWINGS

In order to clearly illustrate the technical solutions of the embodiments of the present disclosure, the drawings that would be used in describing the embodiments will be briefly introduced below. It should be understood that the drawings illustrated below merely include some of the embodiments of the present disclosure and should not be considered as limit to the scope of the present disclosure. For those of ordinary skill in the art, other drawings may be derived based on these drawings without creative efforts.

Figure 1:
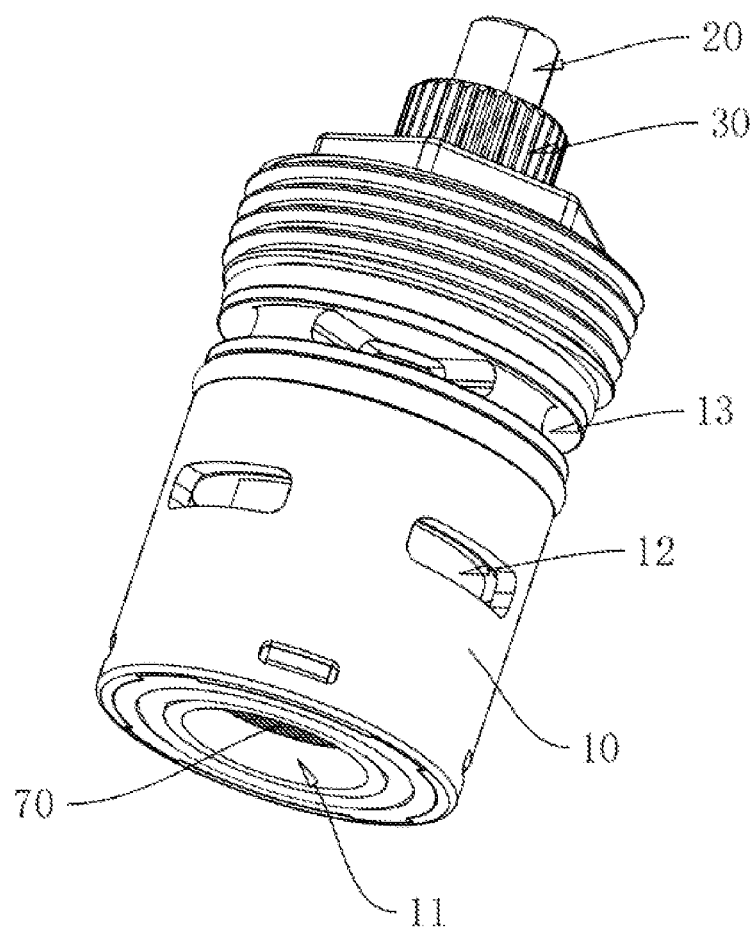
FIG. 1 is an overall structural schematic diagram of one embodiment of the present disclosure.

The reference signs in the accompanying drawings are listed below:
- 10. valve body; 11. water inlet channel; 12. first water outlet; 13. second water outlet; 14. stepped annular groove;
- 20. driving component; 21. plug end; 22. mounting ring; 221. mounting groove; 23. assembling groove; 24. reinforcement ring;
- 30. rotation component; 31. first water outlet chamber; 32. second water outlet chamber;
- 33. bell-mouth structure; 34. rotation sealing gasket;
- 40. reset component; 41. resettable spring; 42. fixation pole;
- 50. first adjustment sheet; 51. first adjustment hole;
- 60. second adjustment sheet; 61. second adjustment hole;
- 70. filter screen.

DETAILED DESCRIPTION OF THE EMBODIMENTS

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other implementations derived by those of ordinary skill in the art without creative effort fall within the scope of the present disclosure. Therefore, the detailed description of the implementation of the present disclosure illustrated in the drawings provided below are not intended to limit the scope of the invention sought to be protected, but rather to show the selected embodiments of the present disclosure.

In the description of the present disclosure, it should be noted that the terms "first", "second" are used only for descriptive purposes and cannot be understood as indicating or implying relative importance or implying the number of indicated technical features. Thus, features that are named with "first" or "second" may indicate or imply that one or more of the features are included. In the description of the present disclosure, "plurality/multiple" means that two or more features are included, unless otherwise expressly defined.

Figure 2:
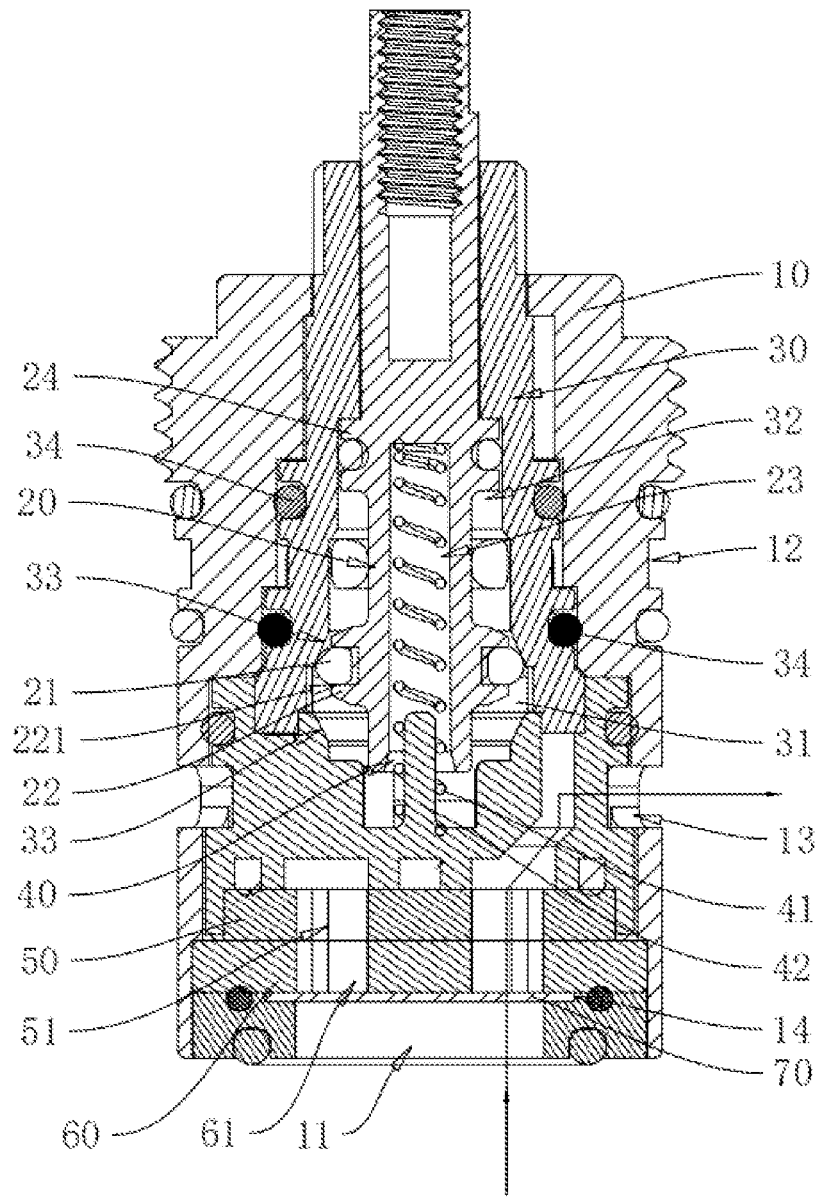
FIG. 2 is a structural schematic diagram showing that a switching valve is in a first water outlet state according to the embodiment of the present disclosure.

As shown in FIG. 1 and FIG. 2, a switching valve includes a valve body 10, and the valve body 10 is internally provided with a water inlet channel 11, a first water outlet 12, a second water outlet 13, a first water outlet chamber 31, and a second water outlet chambers 32. The first water outlet chamber 31 and the second water outlet chamber 32 each has a side wall and a bottom wall, and the first water outlet chamber 31 and the second water outlet chamber 32 are hollowed inside. The openings of the first water outlet chamber 31 and the second water outlet chamber 32 are arranged opposite to each other. The switching valve also includes a driving component 20 slidably connected between the first water outlet chamber 31 and the second water outlet chamber 32, the driving component 20 is a rod-shaped structure, and the driving component 20 has a plug end 21.

As shown in FIG. 1 and FIG. 2, when the driving component 20 slides to a position where the plug end 21 contacts an end portion of the side wall of the second water outlet chamber 32, the second water outlet chamber 32 and the plug end 21 form a closed chamber, the water inlet channel 11, the first water outlet chamber 31, and the first water outlet 12 are interconnected, and the water flow entering the valve body 10 can sequentially pass the water inlet channel 11, the first water outlet chamber 31, and the first water outlet 12. In this situation, the valve body 10 is in the first water outlet state, the switching valve enables water to flow out from the handheld shower. The arrows in the drawings indicate the water flow direction in the valve body 10 when the valve body 10 is in the first water outlet state.

Figure 3:
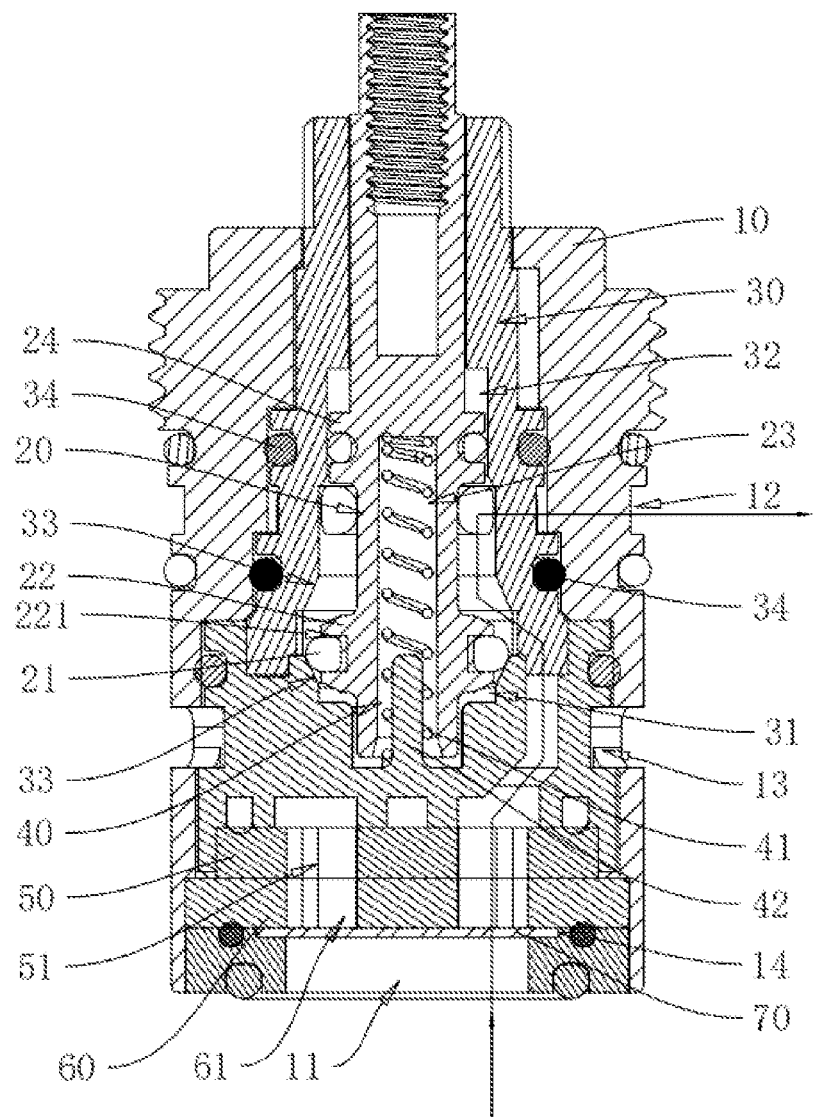
FIG. 3 is a structural schematic diagram showing that a switching valve is in a second water outlet state according to the embodiment of the present disclosure.

As shown in FIG. 1 and FIG. 3, when the driving component 20 slides to a position where the plug end 21 contacts an end portion of a side wall of the first water outlet chamber 31, the first water outlet chamber 31 and the plug end 21 form a closed chamber, the water inlet channel 11, the second water outlet chamber 32, and the second water outlet 13 are interconnected, and the water flow entering the valve body 10 can sequentially pass the water inlet channel 11, the second water outlet chamber 32, and the second water outlet 13. In this situation, the valve body 10 is in the second water outlet state, the switching valve enables water to flow out from the top spray. The arrows in the drawings indicate the water flow direction in the valve body 10 when the valve body 10 is in the second water outlet state.

As shown in FIG. 2 and FIG. 3, the inner circumference of the end portion of the side wall of the first water outlet chamber 31 and the second water outlet chamber 32 has a bell-mouth structure 33, and the bell-mouth structure 33 is inclined outward in a direction away from the bottom wall of the first water outlet chamber 31 or the second water outlet chamber 32. Namely, the side wall may be inclined downward or upward along the sliding direction of the driving component 20. When switching between the first water outlet state and the second water outlet state, the plug end 21 forms a closed chamber with the end portion of the side wall of the first water outlet chamber 31 or the second water outlet chamber 32.

When the driving component 20 slides, a negative pressure is formed in the closed chamber, and the air resistance and the liquid viscous force of the water flow will impede the movement of the driving component 20. The design of the bell-mouth structure can overcome the air resistance and the liquid viscous force of the water flow during the movement of the driving component 20, thus the user can slide the driving component 20 smoothly without great effort to operate the driving component 20.

Specifically, as shown in FIG. 2, a mounting ring 22 protrudes from the circumference of the driving component 20, and the mounting ring 22 has a mounting groove 221. The plug end 21 has an elastic ring that is arranged in the mounting groove 221 in interference fit manner. The elastic ring may be elastically deformable rubber products.

As shown in FIG. 2 and FIG. 3, an outer diameter of the elastic ring is smaller than a diameter of the end portion of the side wall of the first water outlet chamber 31, and the outer diameter of the elastic ring is also smaller than a diameter of the end portion of the side wall of the second water outlet chamber 32. Therefore, when the driving component 20 slides to contact/abut against the side wall of the first water outlet chamber 31 or the second water outlet chamber 32, the elastic ring closely presses against the side wall of the first water outlet chamber 31 or the second water outlet chamber 32, thereby improving the sealing performance of the closed chamber, such that the water can flow out from the first water outlet chamber 31 or the second water outlet chamber 32 completely, thereby reducing the possibility of water leakage inside the valve body 10.

As shown in FIG. 2 and FIG. 3, the switching valve also includes a reset component 40 arranged between the driving component 20 and the inner wall of the valve body 10. When the valve body 10 is in the second water outlet state, the reset component 40 can automatically control the driving component 20 to reset, so as to make the valve body 10 automatically return to the first water outlet state.

Specifically, as shown in FIG. 2 and FIG. 3, the driving component 20 is internally provided with an assembling groove 23, and the reset component 40 is a resettable spring 41. One end of the resettable spring 41 is fixedly connected to the bottom of the assembling groove 23, and the other end of the resettable spring 41 is fixedly connected to the bottom wall of the first water outlet chamber 31. A reinforcement ring 24 is provided on the circumference of the driving component 20, and a diameter of the reinforcement ring 24 is larger than that of the driving component 20.

In the case of no external force applied, only relying on the natural extension of the resettable spring 41, the driving component 20 can be controlled to move to the position where the plug end 21 of the driving component 20 closely contacts/abuts against the end portion of the second water outlet chamber 32. In this situation, the reinforcement ring 24 closely contacts/abuts against the bottom wall of the second water outlet chamber 32 to limit the separation of the driving component 20 from the valve body 10.

In order to improve the stability of the driving ring 20 in the sliding process, a rubber gasket is mounted on the reinforcement ring 24, and the rubber gasket is configured to contact the groove wall of the assembling groove 23 to reduce the gap between the reinforcement ring 24 and the groove wall of the assembling groove 23, thereby ensuring that the driving rod 20 will only move when the user applies an external force.

As shown in FIG. 2 and FIG. 3, in order to improve the stability of the installation of the resettable spring 41, the bottom wall of the first water outlet chamber 31 is vertically and fixedly provided with a fixation pole 42, and the fixation pole 42 partly extends into the assembling groove 23, and the resettable spring 41 sleeves around the circumference of the fixation pole 42. When the resettable spring 41 is stretched or compressed, the resettable spring 41 can always deform along the length direction of the fixation pole 42, so as to provide guidance for the resettable spring 41.

As shown in FIG. 2 and FIG. 3, in order to facilitate the user to adjust the flow rate of the water passage and improve the practicability of the switching valve, the valve body 10 is internally provided with a rotation component 30. The valve body 10 has a side wall and a bottom wall separable with the side wall. The bottom wall of the valve body 10 is fixedly connected to the side wall of the valve body 10 by means of interference fit and snap fit, and the rotation component 30 is rotatably connected to the inner wall surface of the side wall of the valve body 10.

As shown in FIG. 2 and FIG. 3, the water inlet channel 11 is located on the bottom wall of the valve body 10, and the first water outlet 12 and the second water outlet 13 are both located on the side wall of the valve body 10. The first water outlet chamber 31 and the second water outlet chamber 32 are arranged inside the rotation component 30 and are arranged opposite to each other, and the driving component 20 is slidably configured in the rotation component 30.

Figure 4:
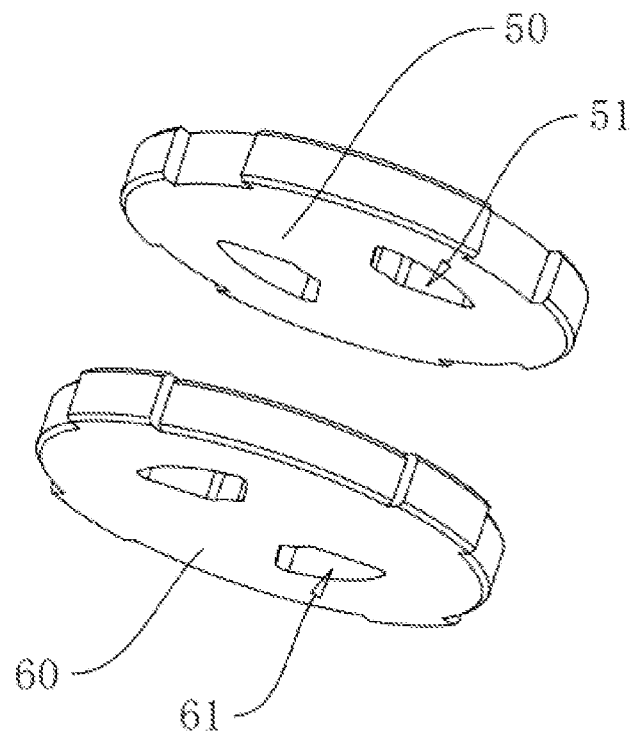
FIG. 4 is a structural schematic diagram showing a first adjustment sheet and a second adjustment sheet according to the embodiment of the present disclosure.
Figure 5:
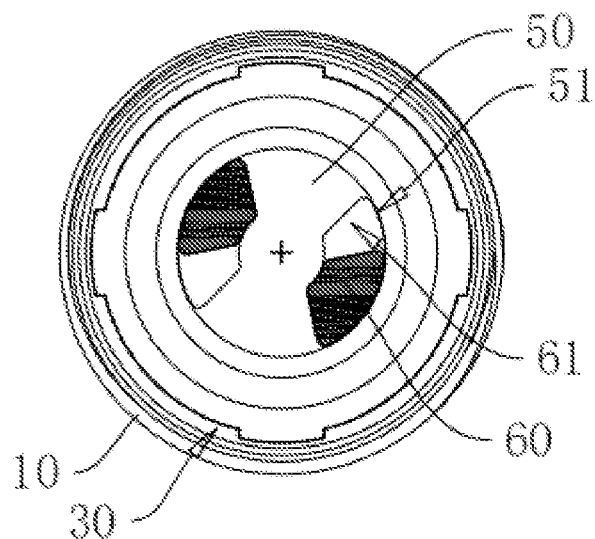
FIG. 5 is a structural schematic diagram showing that the first adjustment sheet and the second adjustment sheet are misaligned according to the embodiment of the present disclosure.

As shown in FIG. 3, FIG. 4, and FIG. 5, an end of the rotation component 30 proximal to the bottom wall of the valve body 10 has a first adjustment sheet 50, and the first adjustment sheet 50 is provided with a first adjustment hole 51. A second adjustment sheet 60 is installed on the side wall of the valve body 10, and the second adjustment sheet 60 is provided with a second adjustment hole 61. The second adjustment hole 61 communicates with the water inlet channel 11, and the first adjustment sheet 50 is attached to the second adjustment sheet 60. In this embodiment, both the first adjustment sheet 50 and the second adjustment sheet 60 are made of ceramics, which have the advantages of high hardness, high wear resistance, high corrosion resistance, and good stability under high temperature.

As shown in FIG. 3, FIG. 4, and FIG. 5, in an example that the number of the first adjustment holes 51 on the first adjustment sheet 50 is two, and the two first adjustment holes 51 are symmetrically arranged on the first adjustment sheet 50, the number of second adjustment holes 61 on the second adjustment sheet 60 is correspondingly set as two, and the two second adjustment holes 61 are symmetrically arranged on the second adjustment sheet 60.

When the water flow rate of the switching valve needs to be adjusted, user can apply torsional force on the rotation component 30 to adjust the overlapping area of the first adjustment hole 51 and the second adjustment hole 61. The larger the overlapping area of the first adjustment hole 51 and the second adjustment hole 61 is, the higher the water flow rate can be, and vice versa. Of course, it can be understood that: when the first adjustment hole 51 and the second adjustment hole 61 are completely overlapped, the water flow rate in the switching valve is maximum; when the first adjustment hole 51 and the second adjustment hole 61 are completely misaligned, the water passage of the switching valve is cut off.

As shown in FIG. 2 and FIG. 3, a rotation gasket 34 is provided between the side wall of the valve body 10 and the rotation component 30, and the rotation component 30 is rotatably connected to the valve body 10 through the rotation gasket 34. It should be noted here that there is a relatively large frictional force between the rotation component 30 and the side wall of the valve body 10, and the rotation component 30 and the valve body 10 remain relatively static without being driven by an external force. Only when the user applies torsional force on the rotation component 30, the rotation component 30 will rotate relative to the valve body 10.

As shown in FIG. 1, FIG. 2, and FIG. 3, a large amount of water flowing into the valve body 10 through the water inlet channel 11 would cause large noise, especially at the moment when the switching valve is opened, the volume of the noise is the largest, which causes poor user experience. Therefore, a filter screen 70 is provided in the valve body 10, and the filter screen 70 has several water filtering holes.

The filter screen 70 is arranged between the bottom wall of the valve body 10 and the second adjustment sheet 60. The bottom wall is provided with a stepped annular groove 14 for installing the filter screen 70. By configuring the above-mentioned filter screen 70, when the water flows into the valve body 10 from the water inlet channel 11, the water flow passes through the water filtering holes on the filter screen 70 and is divided into several water columns, which can effectively reduce the noise caused by the collision and contact between the water flow and the inner wall of the valve body 10.

As shown in FIG. 1, FIG. 2, and FIG. 3, the assembling sequence of the switching valve is as follows: put the rotation component 30 into the side wall of the valve body 10 from bottom to top, then put the filter screen 70 into the stepped annular groove 14 of the switching valve by snap-fit manner, finally engage the bottom wall of the switching valve with the end portion of the side wall of the valve body 10 by interference-fit and snap-fit manner to make the base of the valve body 10 contacts/abuts against the second adjustment sheet 60, thus the assembly of the switching valve is completed.

The above description merely includes preferred embodiments of the present disclosure, and is not intended to limit the present disclosure. For those skilled in the art, the present disclosure may have various modifications and changes. Any modification, equivalent substitution, improvement, etc. made within the spirit and principles of the present disclosure shall be considered as falling within the protection scope of the present disclosure.

What is claimed is:

1. A switching valve, comprising:
a valve body, wherein the valve body is provided with a water inlet channel, a first water outlet, and a second water outlet, the valve body is internally provided with a first water outlet chamber and a second water outlet chamber, openings of the first water outlet chamber and the second water outlet chamber are arranged opposite to each other, and the first water outlet chamber and the second water outlet chamber each has a hollow cavity surrounded and formed by a bottom wall and a side wall;
a driving component, wherein the driving component has a plug end, and the driving component is slidably connected between the first water outlet chamber and the second water outlet chamber;
when the driving component slides to a position where the plug end contacts an end portion of the side wall of the second water outlet chamber, the first water outlet chamber communicates with the water inlet channel and the first water outlet, and the valve body is in a first water outlet state with the second water outlet chamber closed;
when the driving component slides to a position where the plug end contacts an end portion of the side wall of the first water outlet chamber, the second water outlet chamber communicates with the water inlet channel and the second water outlet, and the valve body is in a second water outlet state with the first water outlet chamber closed; and
a reset component, wherein the reset component is configured to control the driving component to return to the position where the plug end contacts the end portion of the side wall of the second water outlet chamber, such that the valve body is automatically switched from the second water outlet state to the first water outlet state;
wherein the switching valve further comprises a rotation component rotatably arranged in the valve body, an end of the rotation component proximal to the water inlet channel is provided with a first adjustment sheet, the first adjustment sheet is provided with a first adjustment hole, and the valve body is internally provided with a second adjustment sheet attached with the first adjustment sheet, the second adjustment sheet is provided with a second adjustment hole, an overlapping area between the first adjustment hole and the second adjustment hole can be adjusted by rotating the rotation component.

2. The switching valve according to claim 1, wherein the plug end is elastic and deformable, and when the valve body is in the first water outlet state or the second water outlet state, the plug end can tightly contact the end portion of the side wall of the first water outlet chamber or the second water outlet chamber.

3. The switching valve according to claim 1, wherein the end portion of the side wall of the first water outlet chamber and the end portion of the side wall of the second water outlet chamber each has a bell-mouth structure, and the bell-mouth structure extends outwards in an inclined manner in a direction away from the bottom wall of the first water outlet chamber or the second water outlet chamber.

4. The switching valve according to claim 1, wherein the driving component has an assembling groove, and the reset component is a resettable spring located in the assembling groove, an end of the resettable spring is coupled to the bottom wall of the first water outlet chamber, and an opposite end of the resettable spring is coupled to a bottom part of the assembling groove.

5. The switching valve according to claim 4, wherein the bottom wall of the first water outlet chamber is provided with a fixation pole, the resettable spring sleeves around a circumference of the fixation pole, and a deformation direction of the resettable spring is parallel to a length direction of the fixation pole.

6. The switching valve according to claim 1, wherein the driving component is slidably connected in the rotation component, and the first water outlet chamber and the second water outlet chamber are located in the rotation component.

7. The switching valve according to claim 1, wherein the valve body is internally provided with a filter screen and the filter screen is provided closely adjacent to the water inlet channel.

\* \* \* \* \*